(Model.)
I. B. SEELEY.
Truss.
No. 243,632.   Patented June 28, 1881.
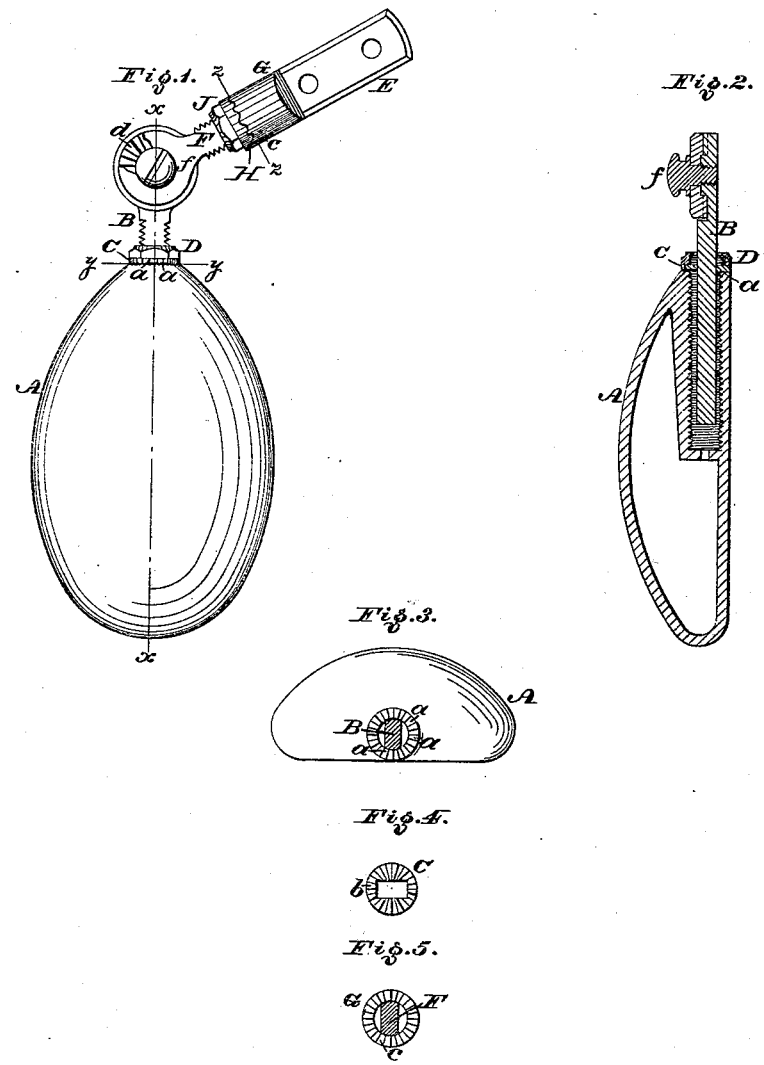

UNITED STATES PATENT OFFICE.

ISAAC B. SEELEY, OF PHILADELPHIA, PENNSYLVANIA.

TRUSS.

SPECIFICATION forming part of Letters Patent No. 243,632, dated June 28, 1881.

Application filed April 14, 1881. (Model.)

*To all whom it may concern:*

Be it known that I, ISAAC B. SEELEY, a citizen of the United States, residing in the city and county of Philadelphia, and State of Pennsylvania, have invented a new and useful Improvement in Trusses for Hernia, &c., which improvement is fully set forth in the following specification and accompanying drawings, in which—

Figure 1 is a face view of the portion of a truss embodying my invention. Fig. 2 is a section thereof, in line $x\,x$, Fig. 1. Fig. 3 is a section in line $y\,y$, Fig. 1. Fig. 4 is a face view of one of the serrated washers. Fig. 5 is a transverse section in line $z\,z$, Fig. 1.

Similar letters of reference indicate corresponding parts in the several figures.

My invention consists of the pad of a truss adjustably connected to a flat stem, which is screw-threaded on opposite sides, and sustains a sliding and non-rotatable washer, which interlocks with the pad and is held in place by a nut on said stem.

It also consists of the arm of the waistband or spring adjustably connected to a flat stem, which is screw-threaded on opposite sides and sustains a sliding and non-rotatable washer, which interlocks with the stem and is held in place by a nut on said stem.

It also consists of serrations integral with the body of the pad.

Referring to the drawings, A represents the pad of a truss for hernia, &c.; and B represents a stem, which is screwed into the pad in the vertical direction thereof, whereby the pad may be raised and lowered on said stem for purposes of adjustment. The stem is flat or quadrilateral in cross-section, and the narrow sides are screw-threaded and they alone engage with the threads in the circular opening of the pad.

Fitted on the stem above the pad is a washer, C, the opening in which is quadrilateral and coincides with the form of the stem, whereby the washer is adapted to slide or be moved up and down on the stem, but is incapable of rotation thereon. On the stem is also fitted a nut, D, of usual form, which engages with the threads of the stem and is adapted to bear against the washer C and tighten it against the pad. The top of the pad at the portion surrounding the opening for the screw-stem has a serrated surface, $a$, in circular order and the under face of the washer C is similarly serrated, as at $b$, so that when the washer is in position the serrated surfaces interlock.

The operation is as follows: Should the nut D be already tightened against the washer, it must be loosened and the washer raised clear of the serrations $a$. The pad may then be rotated the extent required for its vertical and angular or lateral adjustment. The washer is then returned to engaging contact with the serrations $a$ and the nut tightened, whereby the pad and washer are interlocked, and by means of the nut the movement of the washer is prevented, whereby the pad cannot shift and so retains its adjusted position.

E represents the arm, which is connected to the waistband, belt, or spring of the truss; and F represents a screw-stem which is fitted to a boss, G, of said arm and pivoted to the stem B. The edge of the boss G, facing the pivotal connection of the stems F B, is serrated, as at $c$, and engaging with the serrations is a serrated washer, H, against which tightens a nut, J, said washer and nut being fitted on the stem F. The stem F is flat or quadrilateral in cross-section, and the narrow sides are screw-threaded, and said sides alone engage with the threads of the boss G. The opening in the washer H is quadrilateral and coincides with the form of the stem F, whereby, while the washer is adapted to slide or be moved up and down on the stem, it is incapable of rotation thereon. When the nut J is loosened the washer may be moved clear of the serrations $c$ of the boss G. The stem F may then be rotated and moved in and out of the boss relatively to the required adjustment of the pad A. The washer is then returned to engaging and locking contact with the serrations $c$ and the nut J tightened, whereby the stem F is immovable in the boss G and the pad prevented from shifting on the arm E.

While the washers reliably interlock with the respective serrations of the pad and boss, they do not exert any lateral pressure on said serrations, owing to the non-rotatable nature of the washers, whereby said serrations are prevented from being twisted, fractured, or broken off. The serrations $a$ are integral with the pad A, the latter being preferably made of hard rubber, whereby loose and separable serrated plates are avoided, and as the serrations have no lateral strain upon them, as has been stated, the serrations integral with the pad admirably answer the purpose, and may be cheaply and quickly produced by being molded with the pad. The ends of the stems at the place of pivotal connection are enlarged to form head or disks, the contiguous faces of which are serrated, as at d, so that as the stems are adjustable relatively to each other when they are properly set or adjusted and the screw f tightened, the heads or disks interlock and are securely held one to the other.

Having thus described my invention, what I claim as new, and desire to secure by Letters Patent, is—

1. A truss having an adjustable pad, which is connected to the supporting-stem by means of a sliding and non-rotatable serrated washer fitted on said stem and interlocking with the pad, and a tightening-nut also fitted on said stem, substantially as and for the purpose set forth.

2. The screw-stem F, fitted to the serrated boss G of the arm E, and having a sliding and non-rotatable serrated washer, H, and a tightening-nut, J, substantially as and for the purpose set forth.

3. The two stems with serrated heads, and the screw f, combined and operating substantially as and for the purpose set forth.

4. The pad A, for hernia, &c., having serrations a integral therewith, substantially as and for the purpose set forth.

ISAAC B. SEELEY.

Witnesses:
JOHN A. WIEDERSHEIM,
W. F. KIRCHER.